US012733757B2

(12) United States Patent
Villegas

(10) Patent No.: US 12,733,757 B2
(45) Date of Patent: Sep. 15, 2026

(54) COLLECTABLE CAPSULE AND FRAME

(71) Applicant: Omar Villegas, Las Vegas, NV (US)

(72) Inventor: Omar Villegas, Las Vegas, NV (US)

( * ) Notice: Subject to any disclaimer, the term of this patent is extended or adjusted under 35 U.S.C. 154(b) by 50 days.

(21) Appl. No.: 18/914,373

(22) Filed: Oct. 14, 2024

(65) Prior Publication Data

US 2025/0255420 A1 Aug. 14, 2025

Related U.S. Application Data

(60) Provisional application No. 63/552,413, filed on Feb. 12, 2024.

(51) Int. Cl.

*A47G 1/12* (2006.01)
*A47G 1/06* (2006.01)
*A47G 1/16* (2006.01)
*G09F 1/12* (2006.01)

(52) U.S. Cl.

CPC ............... *A47G 1/065* (2013.01); *A47G 1/12* (2013.01); *A47G 1/162* (2013.01); *G09F 1/12* (2013.01); *A47G 2001/0672* (2013.01); *A47G 2001/0694* (2013.01)

(58) Field of Classification Search

CPC ...... A47G 1/12; A47G 2001/0672; G09F 1/12
See application file for complete search history.

(56) References Cited

U.S. PATENT DOCUMENTS

| | | | | |
|---|---|---|---|---|
| 4,286,400 A | 9/1981 | MacPherson et al. | | |
| 10,624,473 B1 | 4/2020 | Tsai | | |
| 10,813,478 B2 | 10/2020 | Spiro et al. | | |
| 10,893,760 B2 | 1/2021 | Han | | |
| 11,735,069 B1 | 8/2023 | Chesnutis | | |
| 2003/0196362 A1* | 10/2003 | Harwell | G09F 1/12 40/781 | |
| 2021/0022467 A1* | 1/2021 | Cox | A45C 13/1069 | |
| 2022/0254280 A1 | 8/2022 | Chiu et al. | | |
| 2022/0415211 A1* | 12/2022 | Taylor | G09F 1/12 | |
| 2023/0061550 A1* | 3/2023 | Newman | G09F 1/12 | |
| 2023/0073593 A1 | 3/2023 | Blom et al. | | |

(Continued)

FOREIGN PATENT DOCUMENTS

KR 20130000833 U * 2/2013 ............... G09F 7/08

*Primary Examiner* — Kyle R Grabowski

(74) *Attorney, Agent, or Firm* — QuickPatents; Kevin Prince

(57) ABSTRACT

A protective holder for collectible items comprises interlocking non-opaque rear and front shells forming an interior space. The rear shell features a rearward depression with a rim, while the front shell has a forward protrusion with a lip, enabling stacking of multiple holders. The shells connect via a mechanical fastening system and a magnetic latch. The rear shell may include a forward depression creating a viewing perimeter around the item. An optional front frame can be attached to the assembled shells. The rear shell's rearward depression includes undercuts for accessories such as a backing board with a stand or hanging loop. An open volume in the rear shell protects item corners. The holder is designed for compatibility with other components and future attachments, and can integrate with conventional picture frames. This design offers versatile display and storage options for collectibles while providing protection.

14 Claims, 5 Drawing Sheets

(56) References Cited

U.S. PATENT DOCUMENTS

| | | | | |
|---|---|---|---|---|
| 2023/0127622 | A1* | 4/2023 | Williams | A47G 1/06 40/711 |
| 2023/0337798 | A1 | 10/2023 | Greenwaldt | |
| 2024/0346955 | A1* | 10/2024 | Newman | G09F 1/12 |

* cited by examiner

COLLECTABLE CAPSULE AND FRAME

CROSS REFERENCE TO RELATED APPLICATIONS

This application claims the benefit of U.S. Provisional Patent Application 63/552,413, filed on Feb. 12, 2024, and incorporated herein by reference.

STATEMENT REGARDING FEDERALLY SPONSORED RESEARCH AND DEVELOPMENT

Not Applicable.

FIELD OF THE INVENTION

This invention relates to protective frames for collectibles, and more particularly to a protective frame with accessory options.

BACKGROUND

Collectors of items such as trading cards, baseball cards, postage stamps, and coins often desire to display their prized possessions. These enthusiasts typically want to showcase their collections rather than keep them hidden away in storage. However, traditional display methods present significant challenges in balancing visibility with protection.

Standard photo frames, while offering good visibility, provide minimal protection for valuable collectibles. These frames leave items vulnerable to environmental factors such as dust, humidity, and UV light, which can cause degradation over time. Additionally, they offer little defense against physical damage from handling or accidental impacts.

On the other hand, more protective enclosures designed specifically for collectibles often prioritize safety at the expense of display quality. These cases may use materials or designs that obscure the item's visibility, making them less than ideal for showcasing a collection. Furthermore, such protective cases are frequently not designed with aesthetics in mind, limiting their suitability for home or office display.

Another significant drawback of existing solutions is their lack of stackability. Many protective cases and frames are not designed to be stacked securely, making storage and transport of multiple items cumbersome and potentially risky. This issue becomes particularly problematic for collectors with extensive collections or those who frequently move their items for shows or appraisals.

Given these limitations, there is a clear need for an innovative solution that combines robust protection with excellent display capabilities. An ideal invention would offer superior protection against environmental and physical damage, allow for clear visibility of the collectible, provide aesthetic appeal for display purposes, and feature a design that enables secure stacking for storage and transport. Such a product would address the current gaps in the market and meet the diverse needs of collectors who wish to both preserve and showcase their valuable items. The present invention accomplishes these objectives.

SUMMARY OF THE INVENTION

The present device is a protective holder for collectible items such as playing cards, coins, or postage stamps. It comprises a rear shell and a front shell, both non-opaque, which interlock to form an interior space for holding the item. The rear shell has a rearward depression that defines a rim, while the front shell has a forward protrusion that defines a lip. This design allows multiple holders to be stacked for storage or transport.

The shells are typically rectangular with four peripheral edges. They connect via a two-part mechanical fastening system on their lower edges and a two-part magnetic latch, or similar latch, on their upper edges. The magnetic latch keeps the shells together but can be manually overcome for separation.

The front side of the rear shell may include a forward depression to receive the item, creating a viewing perimeter around it. A backing sheet can be fixed in the rearward depression of the rear shell, visible through this perimeter as a colorful mat around or behind the item.

An optional front frame can be attached to the assembled shells using a two-part attachment mechanism. The frame's front side preferably aligns flush with the front shell's forward protrusion.

The rear shell's rearward depression includes undercuts for attaching accessories. These may include a backing board with a stand for upright display or a hanging loop for wall mounting.

The rear shell features an open volume around the corners of the interior space to protect the corners of the stored item.

The holder is designed to be compatible with other components and future attachments, and can be integrated with conventional picture frames. The design allows for variations 19 in shape, such as hexagonal or circular frames.

The present invention addresses the limitations of the prior art by providing an innovative solution that combines robust protection with excellent display capabilities. This novel protective holder offers superior safeguarding against environmental and physical damage while allowing clear visibility of the collectible. Its aesthetic appeal makes it suitable for display in various settings, and its ingenious design enables secure stacking for efficient storage and transport. By addressing the current gaps in the market, this invention meets the diverse needs of collectors who wish to both preserve and showcase their valuable items. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the 6 invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
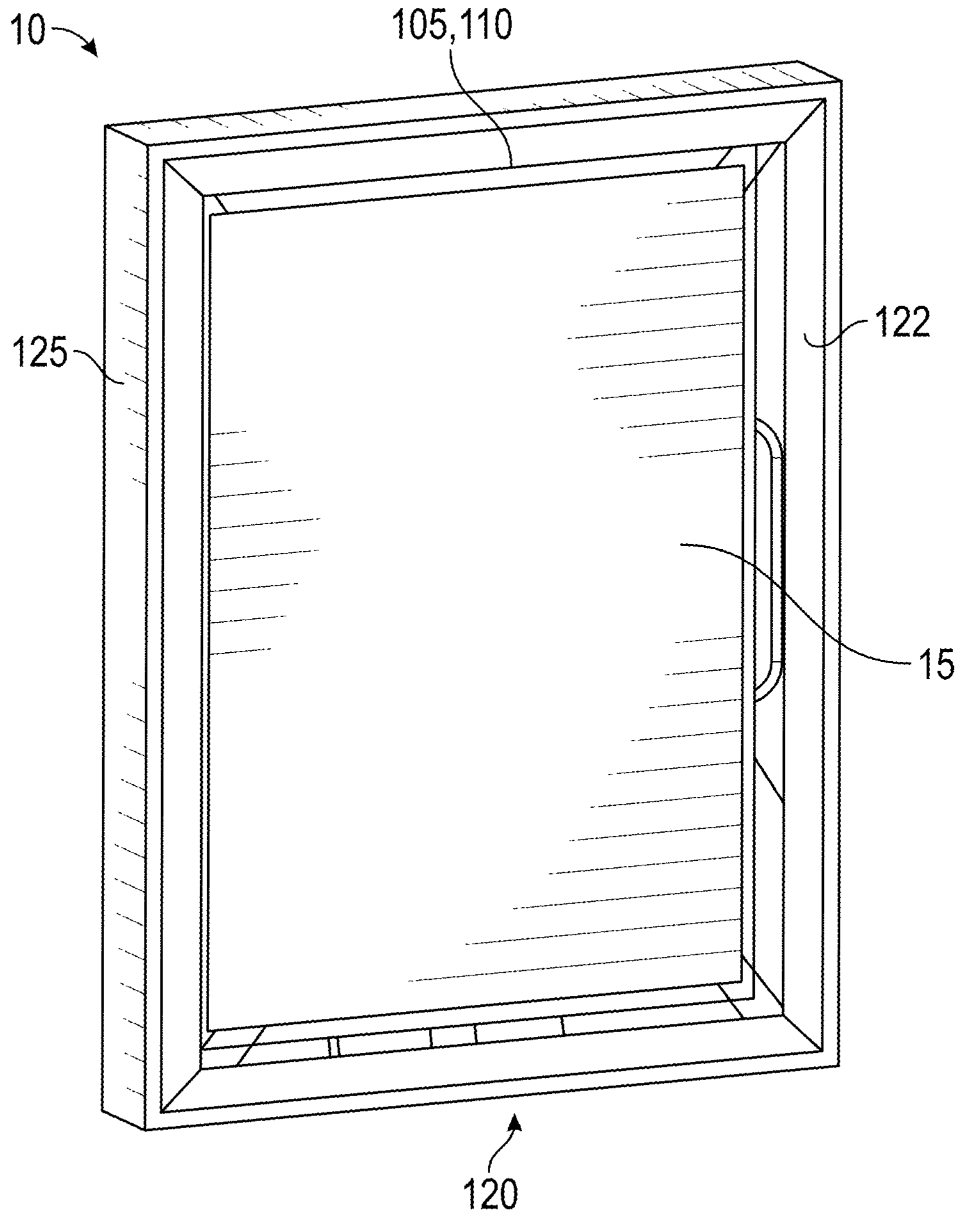
FIG. 1 is a front perspective view of one embodiment of the invention, illustrating a protective holder for a collectible or other item.
Figure 2:
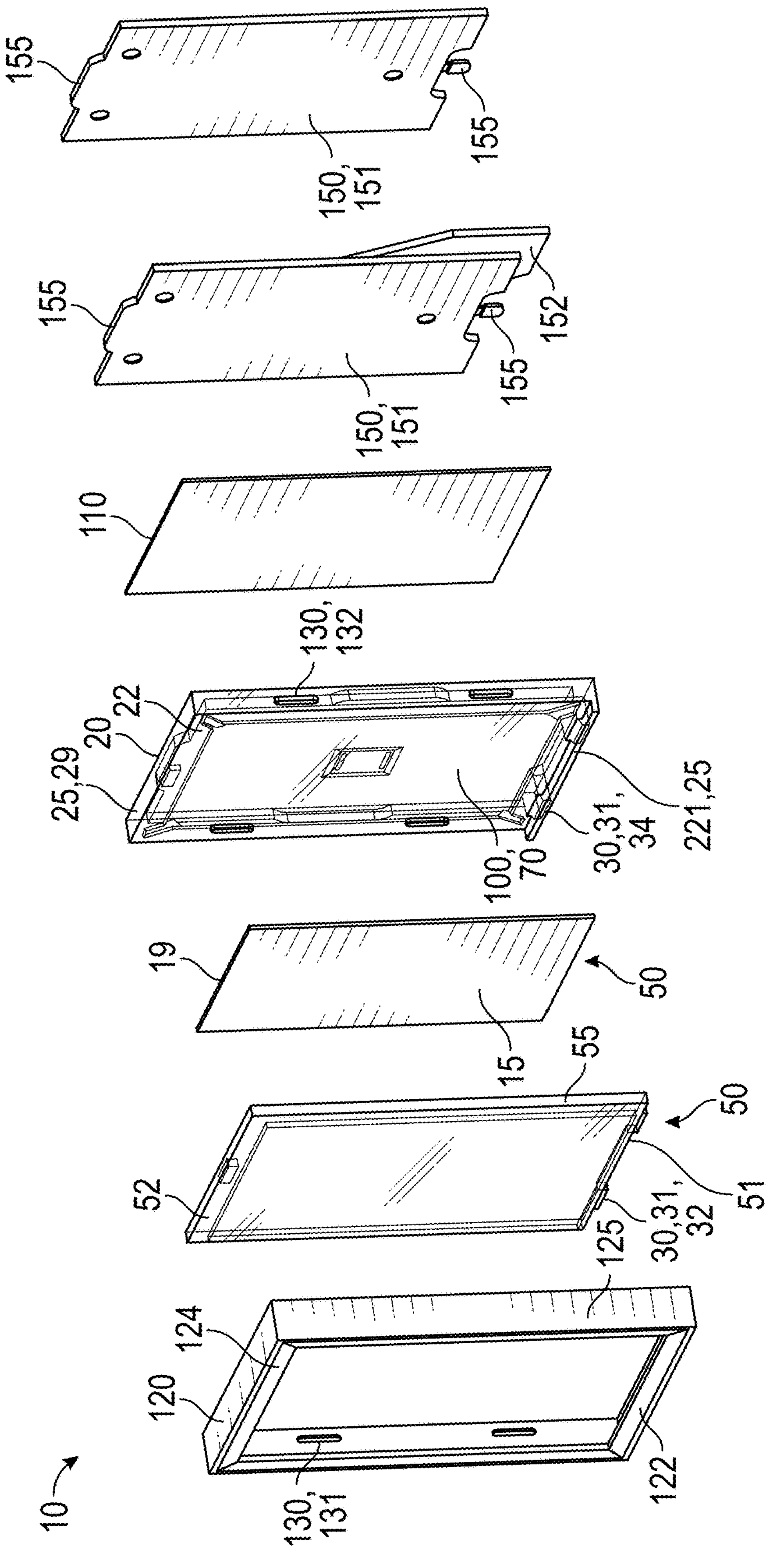
FIG. 2 is an exploded perspective view of the invention.

FIGS. 1 and 2 illustrate a protective holder 10 for an item 15, typically a collectible item 15 such as a playing card, a coin, a postage stamp, or the like. The protective holder 10 comprises a rear shell 20 and a front shell 50. The rear shell 20 includes a rear side 28, a front side 22, and at least one peripheral edge 25. The at least one peripheral edge 25 includes a first part 31 of a two-part mechanical fastening system 30. The rear side 28 of the rear shell 20 includes a rearward depression 40 that defines a rim 45 on the rear side 28 of the rear shell 20 proximate the at least one peripheral edge 25 of the rear shell 20. The rear shell 20 is non-opaque and can be made of clear plastic, acrylic, polycarbonate, or the like. The holder 10 may be adapted for holding many different types of collectible items 15, such as trading cards, sports cards, printed media, physical media, photos, memorabilia, special-edition collectibles, or the like.

Figure 5:
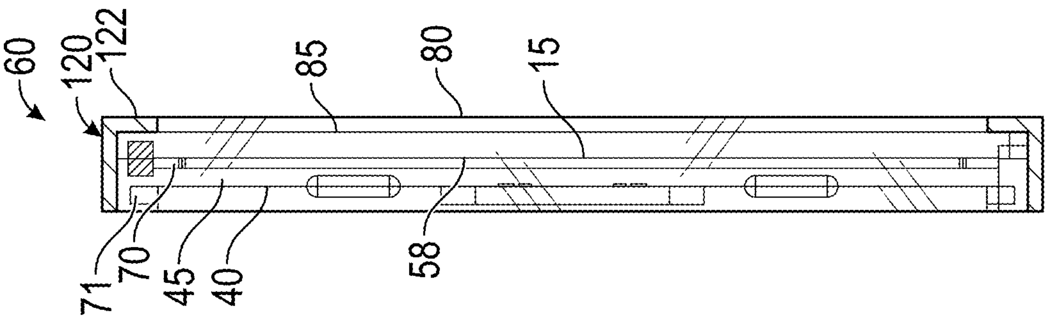
FIG. 5 is a side elevational view of the invention.
Figure 4:
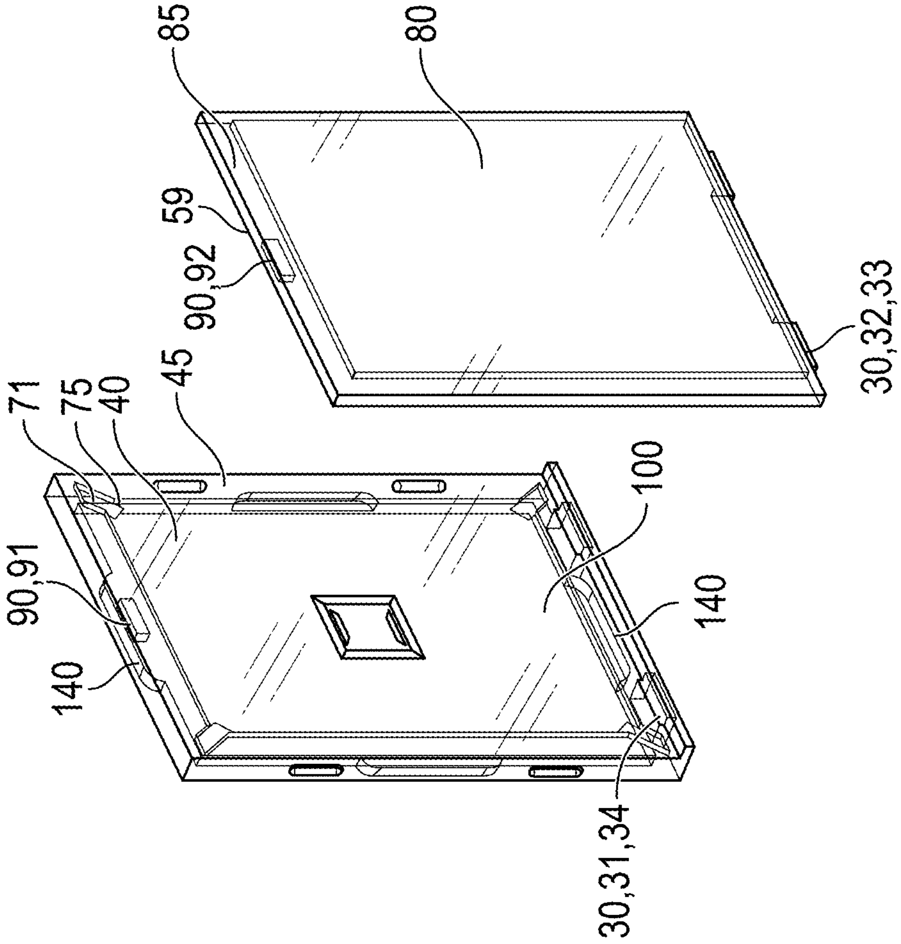
FIG. 4 is an exploded perspective view of one embodiment of the invention.

The front shell 50 includes a rear side 58, a front side 52, and at least one peripheral edge 55. The at least one peripheral edge 55 includes a second part 32 of the two-part mechanical fastening system 30. The front shell 50 is configured for interlocking with the rear shell 20 at the two-part mechanical fastening system 30 in an engaged configuration 60, as shown in FIG. 5. In the engaged configuration 60, the front shell 50 and the rear shell 20 define an interior space 70 therebetween for holding the item 15. The front shell 50 is also non-opaque and can be made of similar materials as the rear shell 20. Both the front shell 50 and the rear shell 20 may be made with a material that filters UV light, to further protect the item 15 from potentially damaging sunlight when displayed in the open.

Figure 6:
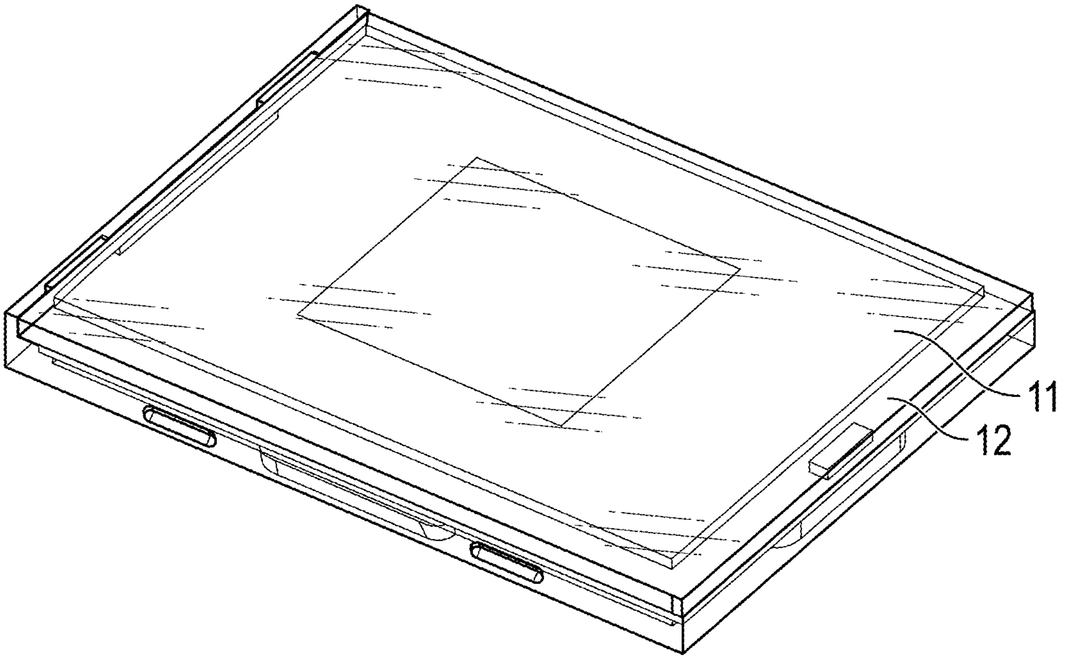
FIG. 6 is a perspective view of a stack of the protective covers of the invention.

The front side 52 of the front shell 50 has a forward protrusion 80 that defines a lip 85 on the front side 52 of the front shell 50 proximate the at least one peripheral edge 55 of the front shell 50. This feature allows multiple protective holders 10 to be stacked, as illustrated in FIG. 6, with the forward protrusion 80 of a first 11 of the protective holders 10 engaging the rearward depression 40 of a second 12 of the protective holders 10.

The rear shell 20 and the front shell 50 may each be rectangular in shape, having four peripheral edges 25,55. In such a configuration, the first part 31 of the two-part mechanical fastening system 30 may be disposed on a lower peripheral edge 21 of the rear shell 20, and the second part 32 of the two-part mechanical fastening system 30 may be disposed on a lower peripheral edge 51 of the front shell 50.

The rear shell 20 may further include a first part 91 of a two-part magnetic latch 90 fixed with an upper peripheral edge 29 of the rear shell 20, and the front shell 50 may have a second part 92 of the two-part magnetic latch 90 fixed with an upper peripheral edge 59 of the front shell 50. Such a configuration allows the two-part magnetic latch 90 to urge the rear shell 20 and the front shell 50 to maintain the engaged configuration 60 when assembled, as shown in FIG. 5. The magnetic latch 90 can be manually overcome to allow separation of the rear shell 20 and the front shell 50. Alternate types of latches May also be utilized, such as snap-fit joints, mechanical latch, friction fit latch, screw fasteners, cam lock mechanisms, mechanical clips or clamps, push-button locks, sliding locks, hook-and-loop type fasteners, locking pins or dowels, or the like (all not shown).

The first part 91 of the two-part magnetic latch 90 may include a magnet, while the second part 92 of the two-part magnetic latch 90 may include a magnetically-attractive material. Alternatively, these components may be reversed, or both may include a magnet. Suitable materials for the magnet include neodymium, ferrite, alnico, or the like. The magnetically-attractive material can be iron, steel, nickel, or the like.

The first part 31 of the two-part mechanical fastening system 30 may include at least one aperture 34, and the second part 32 of the two-part mechanical fastening system 30 may include at least one outwardly projecting prong 33 configured for engaging with the at least one aperture 34. Alternatively, these components may be reversed. The prongs 33 and apertures 34 can be made of durable materials such as reinforced plastic, and may be integrally formed with the rear shell 20 and/or the front shell 50.

The front side 22 of the rear shell 20 may include a forward depression 100 sized to receive the item 15 and defining a viewing perimeter 105 through which a backing sheet 110 fixed in the rearward depression 40 of the rear shell 20 may be seen around the item 15 through the front shell 50. Such a backing sheet 110 can be made of colored paper, cardstock, plastic, or the like. This provides a mat like appearance used in traditional frames.

Figure 3:
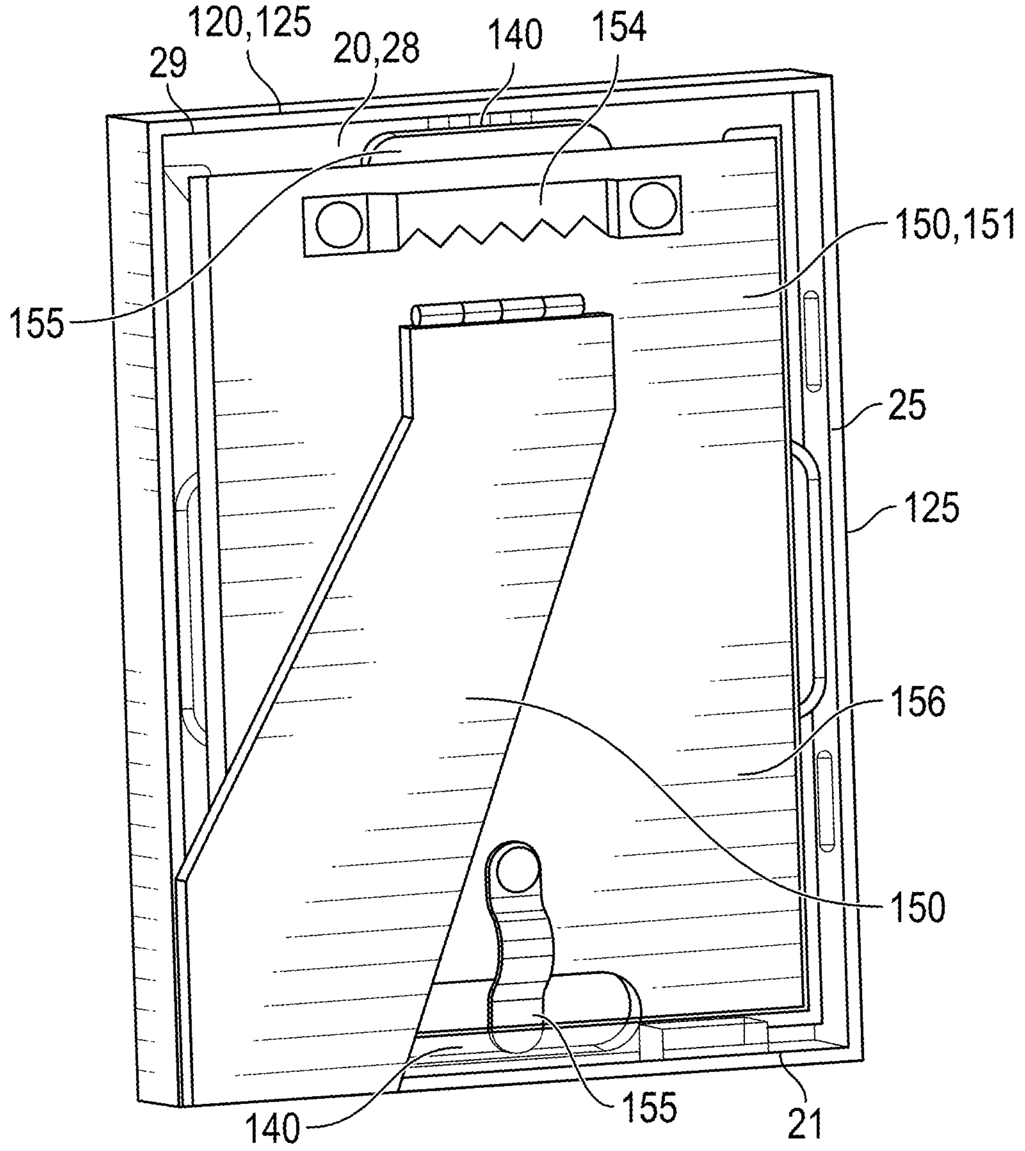
FIG. 3 is a rear perspective view of the invention.

The protective holder 10 may further include a front frame 120 having a rear side 128, a front side 122, a central aperture 124, and at least one peripheral edge 125 that includes a first part 131 of a two-part attachment mechanism 130. The at least one peripheral edge 25 of the rear shell 20 may include a second part 132 of the two-part attachment mechanism 130. Such a configuration allows the frame 120 to be placed over the front shell 50 and the rear shell 20 when they are in the engaged configuration 60, as shown in FIGS. 1-3. The first part 131 and the second part 132 of the two-part attachment mechanism 130 mutually engage to hold the frame 120 onto the front shell 50 and the rear shell 20. The lip 85 of the front shell 50 engages the rear side 128 of the frame 120, with the front side 122 of the frame 120 being flush with the forward protrusion 80 of the front side 52 of the front shell 50. The frame 120 can be made of plastic, metal, wood, rubber, plastic, recycled materials, ceramic, resin, or the like. The first part 131 of the two-part attachment mechanism 130 may include a recess 133, and the second part 132 of the two-part attachment mechanism 130 may include an outwardly-projecting prong 134. Alternatively, these components may be reversed.

Figure 7:
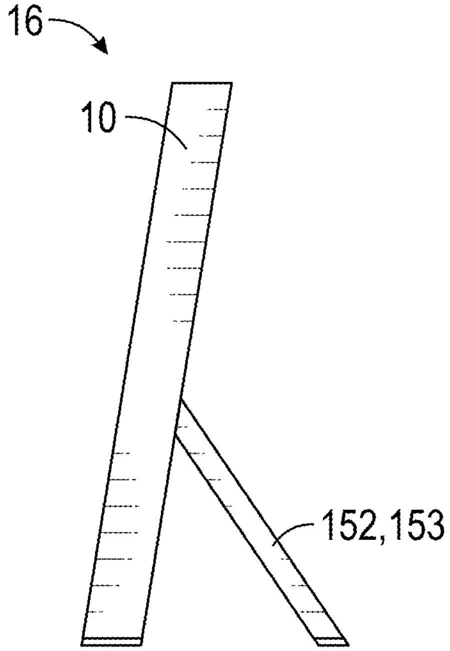
FIG. 7 is a side elevational view of the invention, illustrating an embodiment having a backing plate with a stand.

The rearward depression 40 may include a plurality of undercuts 140 into the rim 45 for receiving a plurality of thin projections 155 from one or more accessories 150. Such 16 accessories 150 may include a backing board 151 with a stand 152 projecting away from a rear surface 156 thereof, as illustrated in FIG. 7. With the backing board 151 engaged with the rearward depression 40 of the rear shell 20 and with the thin projections 155 or alignment tabs engaged with the undercuts 140 of the rear shell 20, and with the stand 152 in an extended configuration 153, the protective holder 10 may be placed upon a surface 16 and supported uprightly by the stand 152 (FIG. 7). The backing board 151 and stand 152 can be made of sturdy materials such as plastic, metal, or the like.

Another accessory 150 may be a backing board 151 having a hanging loop 154 on a rear surface 156 thereof. Such a configuration allows the protective holder 10 to be fixed upon a wall surface (not shown) when the backing board 151 is engaged with the rearward depression 40 of the rear shell 20, the thin projections 155 are engaged with the undercuts 140 of the rear shell 20, and the hanging loop 154 is engaged with a mechanical fastener such as a nail or screw (not shown) that is engaged with the wall surface. The hanging loop 154 can be made of durable materials such as metal, plastic, or the like.

The rear shell 20 may have an open volume 71 around corners 75 of the interior space 70 for inhibiting contact of the rear shell 20 with corners 19 of the item 15. This feature helps protect delicate items from damage during insertion, removal, or storage.

The protective holder 10 can be designed to fit other common components and future attachments. It can be integrated with a conventional picture frame, as shown in FIG. 3.

While a particular form of the invention has been illustrated and described, it will be apparent that various modifications can be made without departing from the spirit and scope of the invention. For example, the frame may take on a different shape than rectangular, such as hexagonal or circular. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted 8 above, particular terminology used when describing certain features or aspects of the invention should not be taken to imply that the terminology is being redefined herein to be restricted to any specific characteristics, features, or aspects of the invention with 11 which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A protective holder (10) for an item (15), comprising:

a rear shell (20) that includes a rear side (28), a front side (22), and at least one peripheral edge (25) that includes a first part (31) of a two-part mechanical fastening system (30), the rear side (28) of the rear shell (20) including a rearward depression (40) that defines a rim (45) on the rear side (28) of the rear shell (20) proximate the at least one peripheral edge (25) of the rear shell (20), the rear shell (20) being non-opaque;

a front shell (50) that includes a rear side (58), a front side (52), and at least one peripheral edge (55) that includes a second part (32) of the two-part mechanical fastening system (30), the front shell (50) configured for interlocking with the rear shell (20) at the two-part mechanical fastening system (30) in an engaged configuration (60) wherein the front shell (50) and the rear shell (20) define an interior space (70) therebetween for holding the item (15), the front shell (50) being non-opaque;

the front side (52) of the front shell (50) having a forward protrusion (80) that defines a lip (85) on the front side (52) of the front shell (50) proximate the at least one peripheral edge (55) of the front shell (50);

a front frame (120) having a rear side (128), a front side (122), a central aperture (124), and at least one peripheral edge (125) that includes a first part (131) of a two-part attachment mechanism (130), the at least one peripheral edge (25) of the rear shell (20) including a second part (132) of the two-part attachment mechanism (130);

whereby multiple of the protective holders (10) can be stacked, the forward protrusion (80) of a first (11) of the protective holders (10) engaging the rearward depression (40) of a second (12) of the protective holders (10); and whereby the frame (120) can be placed over the front shell (50) and the rear shell (20) when the front shell (50) and the rear shell (20) are in the engaged configuration (60), the first part (131) and the second part (132) of the two-part attachment mechanism (130) mutually engaging to hold the frame (120) onto the front shell (50) and the rear shell (20), the lip (85) of the front shell (50) engaging the rear side (128) of the frame (120), the front side (122) of the frame (120) being flush with the forward protrusion (80) of the front side (52) of the front shell (50).

2. The protective holder (10) of claim 1 wherein the rear shell (20) and the front shell (50) are each rectangular in shape, each having four of the peripheral edges (25,55), the first part (31) of the two-part mechanical fastening system (30) being disposed on a lower peripheral edge (21) of the rear shell (20) and the second part (32) of the two-part mechanical fastening system (30) being disposed on a lower peripheral edge (51) of the front shell (50), the rear shell (20) having a first part (91) of a two-part magnetic latch (90) fixed with an upper peripheral edge (29) of the rear shell (20), and the front shell (50) having a second part (92) of the two-part magnetic latch (90) fixed with an upper peripheral edge (59) of the front shell (50), whereby when in the engaged configuration (60) the two-part magnetic latch (90) urges the rear shell (20) and the front shell (50) to maintain the engaged configuration (60), overcoming a magnetic force between the first part (91) and the second part (92) of the two-part magnetic latch (90) allowing separation of the rear shell (20) and the front shell (50).

3. The protective holder (10) of claim 2 wherein the first part (91) of the two-part magnetic latch (90) includes a magnet, and the second part (92) of the two-part magnetic latch (90) includes a magnetically-attractive material.

4. The protective holder (10) of claim 2 wherein the front side (22) of the rear shell (20) includes a forward depression (100) sized to receive the item (15) and defining a viewing perimeter (105) through which a backing sheet (110) fixed in the rearward depression (40) of the rear shell (20) may be seen around the item (15) through the front shell (50).

5. The protective holder (10) of claim 2 wherein the first part (91) of the two-part magnetic latch (90) includes a magnetically-attractive material, and the second part (92) of the two-part magnetic latch (90) includes a magnet.

6. The protective holder (10) of claim 1 wherein the first part (31) of the two-part mechanical fastening system (30) includes at least one aperture (34), and the second part (32) of the two-part mechanical fastening system (30) includes at least one outwardly projecting prong (33) configured for engaging with the at least one aperture (34).

7. The protective holder (10) of claim 1 wherein the first part (131) of the two-part attachment mechanism (130) includes a recess (133), and the second part (132) of the two-part attachment mechanism (130) includes an outwardly-projecting prong (134).

8. The protective holder (10) of claim 1 wherein the first part (131) of the two-part attachment mechanism (130) includes an outwardly-projecting prong (134), and the second part (132) of the two-part attachment mechanism (130) includes recess (133).

9. The protective holder (10) of claim 1 wherein the rearward depression (40) includes at least one undercut (140) formed into the rim (45), and further comprising a removable accessory (150) having at least one thin projection (155), the at least one thin projection (155) configured to engage with the at least one undercut (140) to releasably secure the removable accessory (150) to the rear shell (20).

10. The protective holder (10) of claim 9 wherein the removable accessory (150) is a backing board (151) with a stand (152) projecting away from a rear surface (156) thereof, whereby with the backing board (151) engaged with the rearward depression (40) of the rear shell (20) and with the at least one thin projection (155) engaged with the at least one undercut (140) of the rear shell (20), and with the stand (152) in an extended configuration (153), the protective holder (10) may be placed upon a surface (16) and supported uprightly by the stand (152).

11. The protective holder (10) of claim 9 wherein the removable accessory (150) is a backing board (151) having a hanging loop (154) on a rear surface (156) thereof, whereby with the backing board (151) engaged with the rearward depression (40) of the rear shell (20) and with the at least one thin projection (155) engaged with the at least one undercut (140) of the rear shell (20), and with the hanging loop (154) engaged with a mechanical fastener on a wall surface, the protective holder (10) may be fixed upon the wall surface.

12. The protective holder (10) of claim 1 wherein the rear shell (20) and the front shell (50) are each rectangular in shape, each having four of the peripheral edges (25,55), the first part (31) of the two-part mechanical fastening system (30) being disposed on a lower peripheral edge (21) of the rear shell (20) and the second part (32) of the two-part mechanical fastening system (30) being disposed on a lower peripheral edge (51) of the front shell (50), the rear shell (20) having an open volume (71) around corners (75) of the interior space (70) for inhibiting contact of the rear shell (20) with corners (19) of the item (15).

13. A protective holder (10) for an item (15), comprising:

a rear shell (20) that includes a rear side (28), a front side (22), and four peripheral edges (25) that include a first part (31) of a two-part mechanical fastening system (30), the rear side (28) of the rear shell (20) including a rearward depression (40) that defines a rim (45) on the rear side (28) of the rear shell (20) proximate the peripheral edges (25) of the rear shell (20), the rear shell (20) being non-opaque, the front side (22) of the rear shell (20) including a forward depression (100) sized to receive the item (15) and defining a viewing perimeter (105) through which a backing sheet (110) fixed in the rearward depression (40) of the rear shell (20) may be seen around the item (15);

a front shell (50) that includes a rear side (58), a front side (52), and four peripheral edges (55) that include a second part (32) of the two-part mechanical fastening system (30), the front shell (50) configured for interlocking with the rear shell (20) at the two-part mechanical fastening system (30) in an engaged configuration (60) wherein the front shell (50) and the rear shell (20) define an interior space (70) therebetween for holding the item (15), the front shell (50) being non-opaque;

the front side (52) of the front shell (50) having a forward protrusion (80) that defines a lip (85) on the front side (52) of the front shell (50) proximate the peripheral edges (55) of the front shell (50);

wherein the first part (31) of the two-part mechanical fastening system (30) is disposed on a lower peripheral edge (21) of the rear shell (20) and includes at least one aperture (34), and the second part (32) of the two-part mechanical fastening system (30) is disposed on a lower peripheral edge (51) of the front shell (50) and includes at least one outwardly projecting prong (33) configured for engaging with the at least one aperture (34);

wherein the rear shell (20) has a first part (91) of a two-part magnetic latch (90) fixed with an upper peripheral edge (29) of the rear shell (20), and the front shell (50) has a second part (92) of the two-part magnetic latch (90) fixed with an upper peripheral edge (59) of the front shell (50), whereby when in the engaged configuration (60) the two-part magnetic latch (90) urges the rear shell (20) and the front shell (50) to maintain the engaged configuration (60), wherein the first part (91) of the two-part magnetic latch (90) includes a magnet, and the second part (92) of the two-part magnetic latch (90) includes a magnetically-attractive material;

a front frame (120) having a rear side (128), a front side (122), a central aperture (124), and four peripheral edges (125) that include a first part (131) of a two-part attachment mechanism (130), the peripheral edges (25) of the rear shell (20) including a second part (132) of the two-part attachment mechanism (130), whereby the frame (120) can be placed over the front shell (50) and the rear shell (20) when the front shell (50) and the rear shell (20) are in the engaged configuration (60), the first part (131) and the second part (132) of the two-part attachment mechanism (130) mutually engaging to hold the frame (120) onto the front shell (50) and the rear shell (20), the lip (85) of the front shell (50) engaging the rear side (128) of the frame (120), the front side (122) of the frame (120) being flush with the forward protrusion (80) of the front side (52) of the front shell (50), wherein the first part (131) of the two-part attachment mechanism (130) includes a recess (133), and the second part (132) of the two-part attachment mechanism (130) includes an outwardly-projecting prong (134);

wherein the rearward depression (40) includes a plurality of undercuts (140) into the rim (45) for receiving a plurality of thin projections (155) from one or more accessories (150), wherein one of the accessories (150) is a backing board (151) with a stand (152) projecting away from a rear surface (156) thereof, whereby with the backing board (151) engaged with the rearward depression (40) of the rear shell (20) and with the thin projections (155) engaged with the undercuts (140) of the rear shell (20), and with the stand (152) in an extended configuration (153), the protective holder (10) may be placed upon a surface (16) and supported uprightly by the stand (152);

wherein the rear shell (20) has an open volume (71) around corners (75) of the interior space (70) for inhibiting contact of the rear shell (20) with corners (19) of the item (15); and whereby multiple of the protective holders (10) can be stacked, the forward protrusion (80) of a first (11) of the protective holders (10) engaging the rearward depression (40) of a second (12) of the protective holders (10).

14. A protective holder (10) for an item (15), comprising:

a rear shell (20) that includes a rear side (28), a front side (22), and at least one peripheral edge (25) that includes a first part (31) of a two-part mechanical fastening system (30), the rear side (28) of the rear shell (20) including a rearward depression (40) that defines a rim (45) on the rear side (28) of the rear shell (20) proximate the at least one peripheral edge (25) of the rear shell (20), the rear shell (20) being non-opaque;

a front shell (50) that includes a rear side (58), a front side (52), and at least one peripheral edge (55) that includes a second part (32) of the two-part mechanical fastening system (30), the front shell (50) configured for interlocking with the rear shell (20) at the two-part mechanical fastening system (30) in an engaged configuration (60) wherein the front shell (50) and the rear shell (20) define an interior space (70) therebetween for holding the item (15), the front shell (50) being non-opaque;

the front side (52) of the front shell (50) having a forward protrusion (80) that defines a lip (85) on the front side (52) of the front shell (50) proximate the at least one peripheral edge (55) of the front shell (50);

wherein the rearward depression (40) includes at least one undercut (140) formed into the rim (45);

a removable accessory (150) having at least one thin projection (155), the at least one thin projection (155) configured to engage with the at least one undercut (140) to releasably secure the removable accessory (150) to the rear shell (20), wherein the removable accessory (150) is a backing board (151) with a stand (152) projecting away from a rear surface (156) thereof, whereby with the backing board (151) engaged with the rearward depression (40) of the rear shell (20) and with the at least one thin projection (155) engaged with the at least one undercut (140) of the rear shell (20), and with the stand (152) in an extended configuration (153), the protective holder (10) may be placed upon a surface (16) and supported uprightly by the stand (152); and whereby multiple of the protective holders (10) can be stacked, the forward protrusion (80) of a first (11) of the protective holders (10) engaging the rearward depression (40) of a second (12) of the protective holders (10).

* * * * *